SHEET DELIVERY SLOWDOWN

Original Filed Oct. 4, 1956 4 Sheets-Sheet 1

INVENTORS
VICTOR N. YINGLING
AND HOWARD J. SEEL
BY Hudson, Boughton,
Williams, David & Hoffmann
ATTORNEYS

SHEET DELIVERY SLOWDOWN

Original Filed Oct. 4, 1956 4 Sheets-Sheet 2

INVENTORS
VICTOR N. YINGLING
AND HOWARD J. SEEL
BY Hudson, Houghton, Williams, David & Hoffmann
ATTORNEYS

SHEET DELIVERY SLOWDOWN

Original Filed Oct. 4, 1956 4 Sheets-Sheet 3

INVENTORS
VICTOR N. YINGLING
AND HOWARD J. SEEL
BY Hudson, Boughton,
Williams, David & Hoffmann
ATTORNEYS INVENTORS
VICTOR N. YINGLING
AND HOWARD J. SEEL
BY Hudson, Boughton,
Williams, David & Hoffmann
ATTORNEYS United States Patent Office Re. 25,283
Reissued Nov. 6, 1962

25,283

SHEET DELIVERY SLOWDOWN

Victor N. Yingling and Howard J. Seel, Cleveland, Ohio, assignors to Harris-Intertype Corporation, Cleveland, Ohio, a corporation of Delaware Original No. 2,942,878, dated June 28, 1960, Ser. No. 613,915, Oct. 4, 1956. Application for reissue Apr. 10, 1962, Ser. No. 190,517
26 Claims. (Cl. 271—79)

Matter enclosed in heavy brackets [ ] appears in the original patent but forms no part of this reissue specification; matter printed in italics indicates the additions made by reissue.

This invention relates to improvements in sheet delivery slowdowns, that is to say means for slowing down the rate of travel of a sheet being deposited upon a delivery pile by a delivery mechanism employed in connection with a high speed printing press. Sheets of large size moving rapidly possess considerable inertia, and reducing them to zero speed in the very short interval available presents a difficult problem.

One method presently used with considerable success on paper sheets is disclosed in Patent 2,657,052 to T. J. Elliott in which the tail end of a sheet is dragged over vacuum wheels revolving at a speed slower than sheet speed. Two difficulties have arisen in the operation of this device when used in the delivery of a rotary offset press. First, where cardboard sheets are being handled they do not conform to the curved surface of the suction wheels, and thus the suction is not as effective as upon lighter weight stock, and second, the openings in the suction wheel become clogged with offset powder and lint reducing the suction.

Another method used for assisting in the depositing of sheets onto the delivery pile is shown in Patents 2,208,978 to Harrold et al. and 2,130,841 to Eckhard. In both of these patented devices, metal suckers are used. In the former patent, sheets are first dragged across the suction mouths, vacuum is next applied to the suckers, and then the suckers travel at a decelerating speed to deposit the sheets on the pile. In the latter patent, the suckers first travel with the sheet while vacuum is on, they next stop abruptly and remain in stopped position a short while, and then move vertically downward. It cannot be determined from the patent at what speed the suckers are traveling while both they and grippers hold a sheet but it is a fair presumption that some slippage is present between the suckers and a sheet, due either to a difference in sheet and sucker speed or to the inertia of the sheet when the suckers abruptly stop before they begin moving down. Due to this slippage, it has heretofore been impossible as a practical matter to use any material for the suckers other than one capable of withstanding wear, e.g., metal. For this reason, the patented devices are unable to effectively slow down relatively stiff, heavy sheet material such as cardboard, since the metal suckers are unable to readily conform to the sheets to positively grip them. Furthermore, the thicker the sheets, the stiffer and heavier they become. It can be seen therefore that the problem becomes more acute with an increase in the thickness of the sheet material handled.

It is therefore an object of this invention to provide a method and mechanism for slowing down and gently depositing sheets onto a pile regardless of the thickness, stiffness, or weight of such sheets.

Another object of the invention is to provide such slowdown mechanism with rubber suckers, and to so operate such mechanism that wear of the rubber suckers is kept to a minimum.

A further object of the invention is to provide suckers in a delivery slowdown mechanism, which suckers are capable of conforming to the sheet material being delivered.

Another object of the invention is to provide sheet slowdown mechanism having suckers engageable with the tails of sheets to gently deposit them onto a pile, said slowdown mechanism being operated by a rotary drive and moving said suckers in a continuous path free of any stopping period.

Still another object of the invention is to provide sheet jogging mechanism along the rear of a pile adjacent the slowdown mechanism, both said jogging and slowdown mechanisms being driven from a common rotary shaft on an axis fixed relative to said mechanisms.

Another object of the invention is the provision of suction means for slowing down the movement of a sheet in a delivery which shall be maintained free of offset powder and other foreign matter.

Another object is the provision of a sucker which travels at a speed at least as great as sheet speed when it *engages and* grips the sheet so that there is no slippage between the sucker and sheet and correspondingly little wear upon the sucker.

Another object of the invention is to provide that the slowdown mechanism move the suckers in a generally arcuate path meeting the sheet path, means also being provided for maintaining the sheets in their path for proper reception by the suckers.

Still another object of the invention is to provide the combination of stationary suction means of metal or the like acting on the underside of a sheet being moved over a pile by gripper conveyors so as to maintain the sheet relatively taut, and movable suction means of rubber or the like engageable with the sheet while traveling at least as fast as sheet speed and decelerating the sheet after release by the grippers to deposit it on the pile.

Another object is the provision of air blast means for positively disengaging the tail of a sheet from the slowdown sucker, preferably by having the blast work through the sucker mouth itself.

Other objects and features of novelty will appear as we proceed with the description of that embodiment of the invention which, for the purposes of the present application, we have illustrated in the accompanying drawings, in which.

Figure 1:
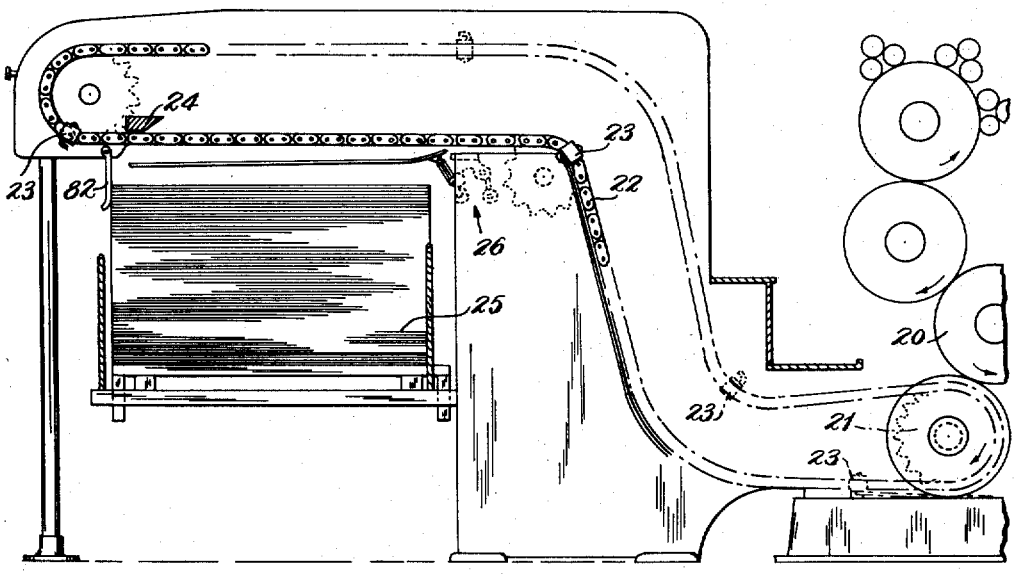
FIG. 1 is a side elevational view of a sheet delivery embodying the invention.
Figure 9:
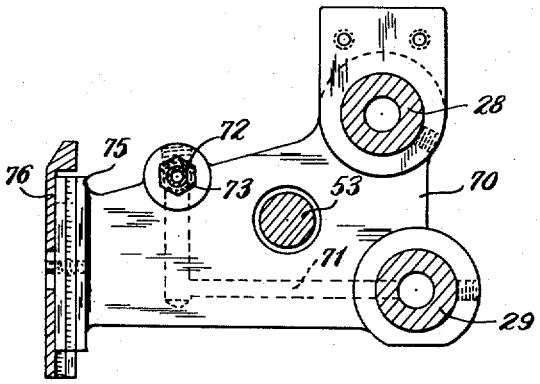
FIG. 9 is a sectional view taken substantially on the line 9—9 of FIG. 3 but on a larger scale.
Figure 2:
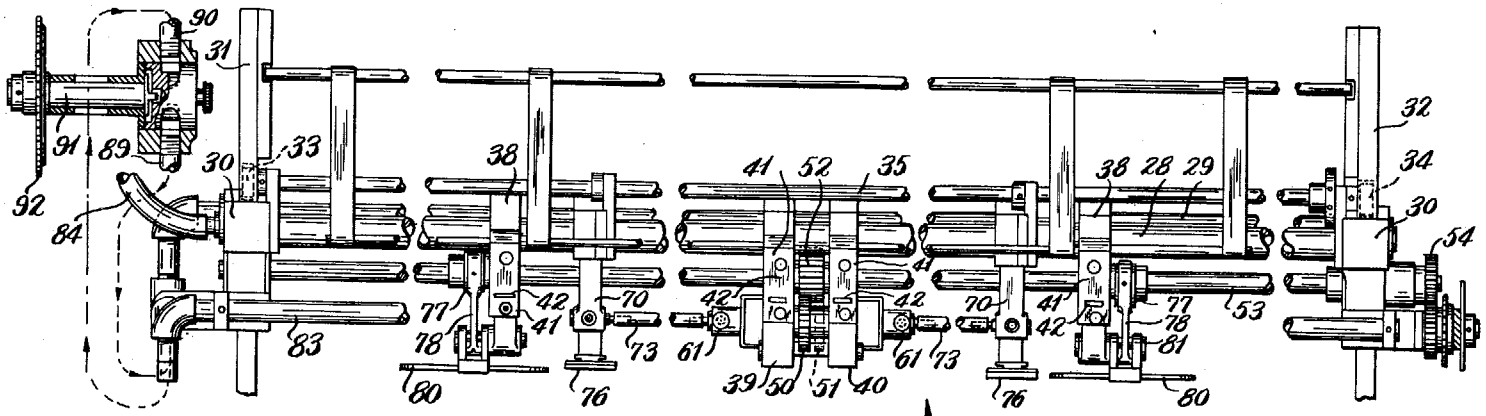
FIG. 2 is a plan view on a larger scale of the slowdown mechanism, taken looking in the direction of line 2 of FIG. 3.

To indicate the locale of the invention there is illustrated in FIG. 1 a sheet delivery of a printing press, the impression cylinder of the final unit of the press being shown at 20, from which sheets are taken by gripper bars 23 of a chain delivery as the bars move over a skeleton cylinder 21. One of the two delivery chains is shown at 22. Grippers on the gripper bars 23 take the sheets from the impression cylinder 20 and carry them forward on the lower run of the chain conveyor until the grippers are operated by a stationary cam 24 to release the sheets. The gripper bars are spaced apart a distance somewhat greater than the length of maximum sheet which the delivery is designed to handle. At about the time the forward end of each sheet drops onto the delivery pile 25, a sucker slowdown indicated generally at 26 takes hold of the tail end of the sheet while the sucker is traveling at or slightly above sheet speed. The sucker thereafter decelerates rapidly, slowing down the sheet movement sufficiently to cause the sheet to settle quietly onto the pile.

The slowdown mechanism 26 is adjustable back and forth as a whole to accommodate it to sheets of different lengths less than that of the maximum sheet for which the machine is designed. When once adjusted for sheets of a given length however, the major part of the slowdown mechanism is fixed and rigid.

Figure 3:
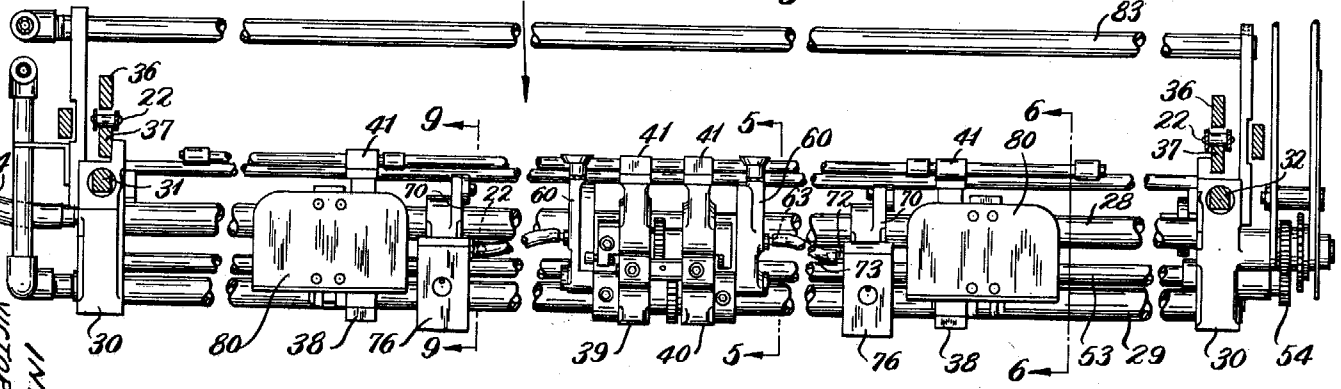
FIG. 3 is an elevational view of the slowdown, taken looking in the direction of line 3 of FIG. 2.

The slowdown comprises two relatively fixed transversely disposed pipes 28 and 29 which are mounted at their ends in frame members 30 adapted to move back and forth for adjustment purposes upon tracks 31 and 32 which have racks on their lower surfaces engaged by pinions 33 and 34 which are fixed to a transverse shaft 35 that can be rotated manually by any suitable means for adjusting the whole slowdown mechanism. Upper and lower tracks 36, 37 are illustrated in FIG. 3, between which tracks each chain 22 runs for guiding its movement in at least the horizontal portion of its travel above the delivery pile.

Figure 4:
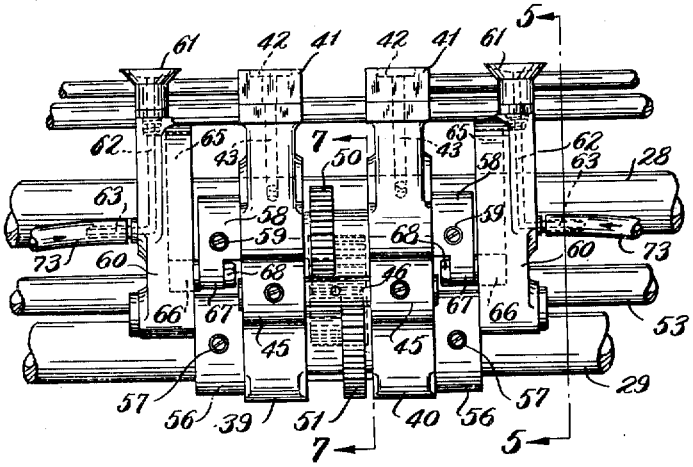
FIG. 4 is a fragmental elevational view on a still larger scale showing the suction plates and slowdown suckers.

The frame of the slowdown 26 comprises two outer brackets 38 having holes therethrough for the reception of pipes 28 and 29, these brackets being attached to the pipes by suitable means. In addition there are two somewhat similar brackets 39 and 40 spaced apart a short distance and mounted on the pipes 28, 29 near the middle of the slowdown. On the upper ends of each of the brackets 39 and 40 and also of the brackets 38 there are suction plates 41, each of which has a suction port 42 at its upper surface. As shown more particularly in FIGS. 5 and 6 these ports connect with passages 43 in the brackets 38, 39 and 40 and with the pipe 28 to connect the bore of that pipe with the upper surfaces of the suction plates. On each of the brackets 39 and 40 there is a boss 45. A bar 46 extends through aligned openings in these bosses and is secured therein by setscrews illustrated in FIGS. 4 and 5 to accurately space the brackets 39 and 40.

Figure 7:
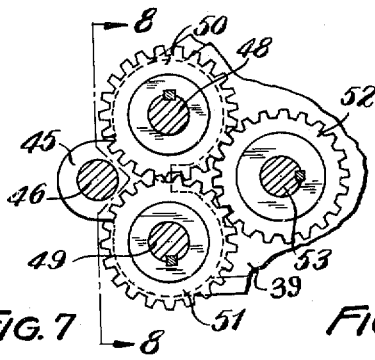
FIG. 7 is a sectional view taken substantially on the line 7—7 of FIG. 4.
Figure 8:
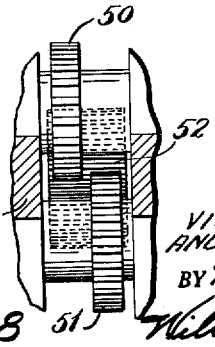
FIG. 8 is a front view of driving gears, the view being taken substantially on the line 8—8 of FIG. 7.
Figures 10, 11, 12:
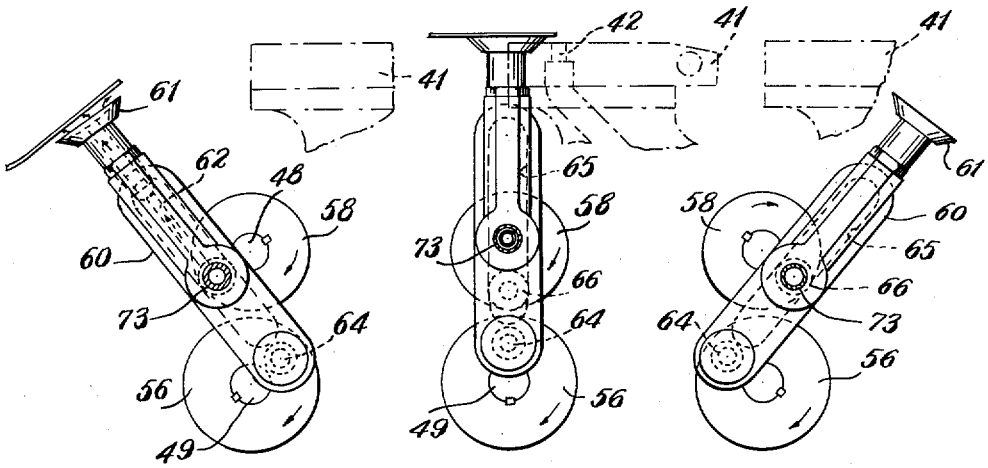
FIGS. 10, 11 and 12 are diagrammatic views showing three different positions.

In bearings in the brackets 39 and 40 there are two short shafts 48, 49, one directly above the other. Each of these shafts projects a short distance beyond the brackets 39 and 40. These shafts have gears 50 and 51 keyed thereto between the brackets 39 and 40 in staggered relation. Both of these gears mesh with a wide gear 52. The latter gear is keyed to a drive shaft 53 which may be driven at one end by a gear 54 secured thereto and rotated in one to one relation with the press so as to turn once for each cycle. As indicated in FIG. 7 the gears 50, 51 and 52 are of the same diameter and the gears 50 and 51 turn in the same direction. Preferably the gears 50 and 51 are mounted upon or are integral with hubs of a length to fit with only slight clearance between the brackets 39 and 40.

On short shaft 49 outwardly of the brackets 39 and 40 there are disks 56 secured to the shaft by keys and setscrews 57. Similarly on the short shaft 48 outwardly of the brackets 39 and 40 there are disks 58 secured to the shaft by keys and setscrews 59. The disks 56 and 58 are of the same diameter substantially as the pitch circles of gears 50 and 51. The two disks 56 are identical except for rights and lefts and the same is true of the two disks 58. Outwardly of the disks 56 and 58 on each side of the center there is a suction arm 60, these arms being identical also except for rights and lefts. Each of these arms carries a resilient suction cup 61 preferably of rubber, at the upper end of the arm, each cup having a flat face or mouth and being connected by a passage 62 with a nipple 63 extending laterally outward at an intermediate point of the arm. Near its lower end each arm is connected with the adjacent disk 56 by a pivot 64 constituting a crank on the disk. On the inner side of each arm 60 there is a lengthwise guide groove 65 in which runs an antifriction cam roller or crank 66 carried on a stud 68 which passes through a reduced thickness portion 67 of the disk 58.

Spaced laterally outwardly a substantial distance from each of the sucker arms 60 there is a bracket 70 supported upon the pipes 28 and 29. Within each of these brackets and connected with the bore of pipe 29 there is a passage 71 which extends up toward the top of the bracket and connects with a nipple 72 mounted in the bracket and projecting horizontally toward the center of the mechanism. Between the nipples 63 and 72 on each side of the center there is a flexible conductor 73 by means of which the bore of pipe 29 is continuously connected with the passages 62 of the sucker arms throughout the movement of those arms.

On the forward face of each bracket 70 there is a plate 75 with guide grooves on its sides which receive a plate 76 that constitutes a stop for the rearward edges of the sheets, these plates being movable vertically to a limited extent.

The shaft 53 is journaled in all of the brackets 38, 39 and 40. Adjacent each of the brackets 38 there are eccentrics 77 on the shaft which operate connecting rods 78 the outer ends of which are pivotally connected at 79 with jogger plates 80 which are pivotally mounted at 81 upon the brackets. The eccentrics are so disposed angularly that directly after each sheet moves forward, the jogger plates swing toward the dotted line position of FIG. 6 to insure the proper positioning of the sheet against stops 82 at the front of the pile.

Mounted in the frame of the slowdown mechanism is an overhead pipe 83 which may be termed a blowdown pipe and which has ports in its lower side from which air blasts may be discharged downwardly at timed intervals against the sheet to help to hold it against the suction plates 41 and toward the suckers 61. The upper pipe 28 is exposed to constant vacuum or suction through a connection 84 to any suitable means for producing suction. Pipe 29 on the other hand is subjected to alternating suction and air pressure as is also pipe 83.

Figure 14:
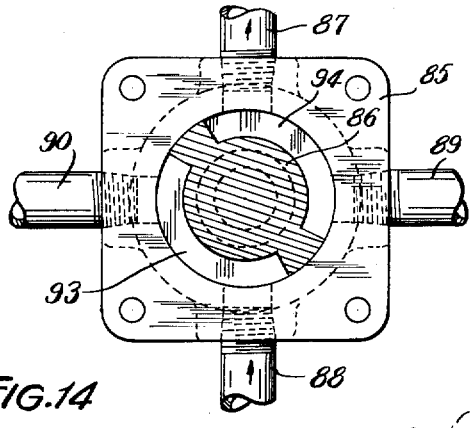
FIG. 14 is a view partly in section of a rotary four-way valve for controlling the application of suction and compressed air to the sucker and a blowdown pipe, the view being taken substantially on the line 14—14 of FIG. 15.
Figure 15:
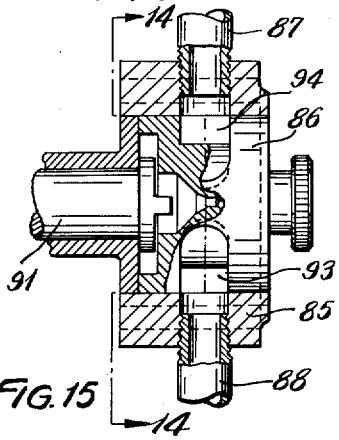
FIG. 15 is a sectional view showing the driving means for the valve rotor.

This alternating effect of suction and pressure is accomplished by means of a rotary four-way valve having a casing 85 and a rotor 86. From the casing 85 a conductor 87 leads to a source of suction and an oppositely disposed conductor 88 leads to air under pressure. At right angles to conductors 87 and 88 there are two conductors 89 and 90, conductor 89 leading to pipe 29 while conductor 90 leads to pipe 83. The shaft 91 for operating the rotor 86 is driven by suitable means, as by a chain running over a sprocket 92, at half the speed of the press. The rotor has two approximately semi-annular grooves 93 and 94. When it is in the position of FIG. 14 conductor 89, pipe 29 and the suckers are connected to conductor 87 and vacuum. At the same time air under pressure from conductor 88 passes out through conductor 90 to pipe 83 to cause air blasts to impinge upon the sheet passing over the slowdown mechanism. When the rotor 86 is turned to a position at right angles to that illustrated in FIG. 14, conductor 89 will be connected to conductor 88 and air under pressure will thereby be ejected through the sucker cups. At the same time suction will be conveyed from conductor 87 to conductor 90 and thence to pipe 83. The suction exerted through pipe 83 will perform no beneficial action. However it will do no harm at that time.

Figure 13:
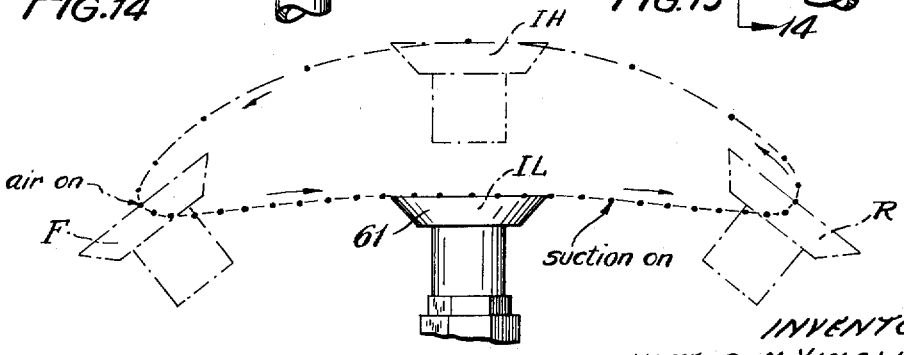
FIG. 13 is a diagrammatic view showing four different positions of sucker movement and indicating the relative speed of movement of the sucker at different points in its travel.

To state briefly the operation of the device, the suckers 61 move forward in a substantially vertical arc which touches the sheet path, grasp the rear end of the sheet while traveling at sheet speed or a trifle faster than sheet speed, decelerate to substantially zero speed, discharge the sheet at substantially the forward end of the sucker travel and return at a level below that of the sheet path. The path of sucker travel is indicated in FIG. 13, where each dot in the loop indicates a point of travel 10° from the preceding dot. The points at which the air blast comes on and at which the suction comes on are marked in the figure, being approximately 180° apart in timing, as called for by the rotation of the rotor 86 of the air and suction valve. That valve turns at one-half press speed and makes a complete reversal at every 90° angle. In other words there is an air blast period and a suction period in each 180° of rotation of the valve and in each complete travel of the suckers through their loop path. As indicated by the spacing of the dots in FIG. 13, the forward movement of the suckers from the rearmost position R to the intermediate high position IH is at an accelerating rate of speed until the top of the arc is reached, and thereafter at a decelerating rate until the forward position F is reached, while in the return travel the sucker moves at a relatively low rate of speed through its intermediate low position IL back to position R.

The arc of movement of the suckers in their forward travel preferably extends slightly above the surface of suction plates 41. The ports in plates 41 are continuously under suction from the pipe 28, which places a drag upon the sheet as it is pulled forward by the gripping on a gripper bar 23. Movement of the suckers 61 is timed so that they take a sheet just as the tail end of the sheet opens the ports 42 in the plates 41. The sheet is therefore tensioned until the suckers 61 grip it. The gripping is assisted by the blasts from the ports in pipe 83 which are effective at that time. These blasts also assist the suckers 61 in grasping the sheet. Since the suckers 61 move at sheet speed or *only slightly* faster when they come into contact with the rear end of the sheet, there is no sliding of the sheet on the suckers and hence no wear upon them. After they thus firmly grasp the sheet they are decelerated rapidly, slowing down the travel of the sheet as it moves into the desired position above the pile 25, the grippers on the gripper bar having been operated in properly timed relation to release the sheet at about the time the suckers take hold. The rotary valve is timed to cause an air blast to be ejected from the suckers against the bottom of the sheet, which insures its release from the suckers. While the air blast through the suckers is on, vacuum is present in the blowdown pipe 83, but it does no harm at that time and the blast is back on again when suction is returned to the suckers 61.

Figure 5:
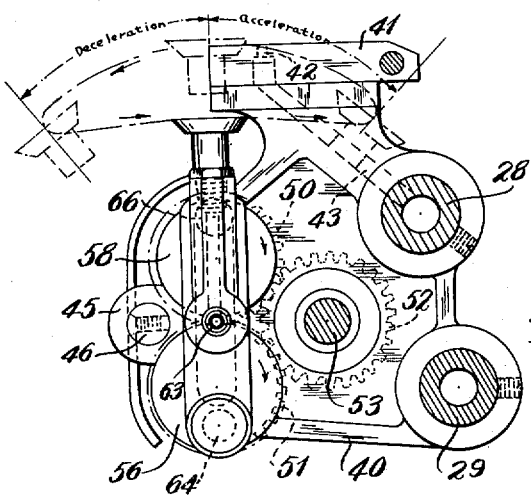
FIG. 5 is a sectional view taken substantially on the line 5—5 of FIGS. 3 and 4.
Figure 6:
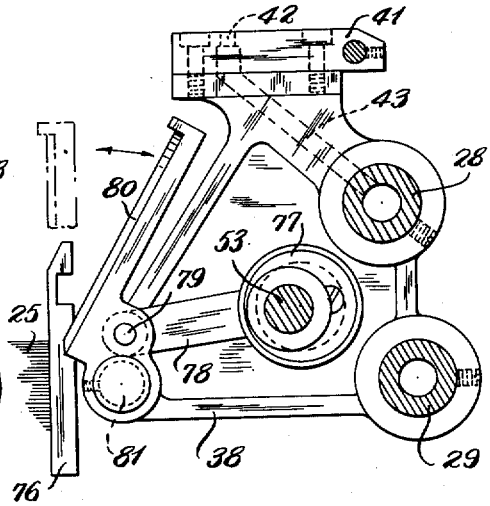
FIG. 6 is a sectional view taken substantially on the line 6—6 of FIG. 3 but on a larger scale.

The successive positions of each sucker as it moves through its loop travel are illustrated in FIGS. 5, 10, 11 and 12. The cranks 64 and 66 are positioned in their disks 56 and 58, 180° apart angularly. In FIG. 5 crank 64 is at the bottom and crank 66 at the top. Next they move to the positions of FIG. 10 which points the suckers diagonally upward toward the right. This requires about 135° of angular movement of the disks 56 and 58. The parts then begin their movement to the position of FIG. 11, when the cranks 64 and 66 are in vertical alignment. This requires an angular movement of the disks 56 and 58 through only 45° approximately. The suckers in that movement must therefore travel at a relatively high rate of speed. Similarly, in their decelerating movement from the FIG. 11 position to that of FIG. 12 the disks 56 and 58 move angularly through another 45° rotation, while in moving from the FIG. 12 position to that of FIG. 5 the disks must turn through another 135° angle which means that the sucker travels slowly until it reaches the FIG. 5 position after which the cycle is repeated. Thus the desired rapid deceleration, in the forward upper part of the loop is accomplished effectively by the simple mechanism illustrated.

Having thus described our invention, we claim:

1. In a sheet delivery slowdown, a sucker having a back and forth travel beneath the sheet path in a direction parallel to the direction of sheet travel, means for exerting suction in the sucker at the time of taking the sheet, means for causing the sucker after it takes a sheet to move forward first in a downward arc while decelerating gradually and evenly to approximately zero speed, then to move rearwardly at low speed and a different level, and then to move forwardly again in an arc approaching the sheet path while accelerating gradually and evenly to sheet speed approximately, means to break suction in said sucker at about the time the forward movement of the sucker reaches zero and to resume suction in the sucker at the time the sucker again moves forward to take the next succeeding sheet.

2. In a sheet delivery slowdown, a sucker traveling below the sheet in a generally horizontal elongated arc shaped loop having upper forward and lower return runs, means for causing the sucker to take the sheet during its forward run at approximately the top of said loop while traveling at sheet speed substantially, to decelerate to approximately zero speed at the front end of the loop, to release the sheet, to return at relatively low speed through the lower run of said loop, to reverse its travel at the rear end of the loop to enter the upper forward run and to accelerate during that run to sheet speed preparatory to taking the next succeeding sheet during the next cycle of the machine.

3. A sheet delivery slowdown as defined in claim 1, comprising means for reversing the flow of air through said sucker at substantially the forward end of its travel to blow the sheet loose from the sucker mouth and to expel foreign matter.

4. A sheet delivery slowdown according to claim 3, comprising a valve having connections to a source of vacuum and a source of compressed air, and having also an outlet to said sucker, and means for operating said valve once for each cycle to connect the sucker with suction for enabling it to take the sheet and for cutting off suction and directing compressed air into the sucker mouth when it reaches the front end of its travel after being decelerated to blow the sheet loose from the sucker mouth and expel foreign matter.

5. In a sheet delivery slowdown, stationary suction plates mounted below the path of sheet travel, adapted to tension a sheet, means for drawing the sheet forward over the plates onto a delivery pile, said plates each having a suction port therethrough that is uncovered as the tail end of the sheet passes over it, a plurality of previously activated suckers disposed beneath the sheet path which rise into proximity with the tail of the sheet as it clears said suction ports in the suction plates, means for moving the suckers forwardly at approximately sheet speed at the time they approach and grip the tensioned sheet and then decelerating rapidly but gradually and evenly to slow down the sheet, and means for braking the suction to the suckers thereafter to cause the sheet to settle on the delivery pile.

6. A sheet delivery slowdown as defined in claim 5, comprising means for causing the suckers at the time they take a sheet to travel forward at a level above the level of said suction plates, and for causing the suckers after they release a sheet to move rearwardly slowly at a level beneath the surface of said suction plates.

7. A sheet delivery slowdown as defined in claim 2, comprising swinging jogger plates at the rear end of a delivery pile, a shaft turning continuously once for each cycle, mechanism driven by said shaft for moving said sucker forwardly and rearwardly during each cycle, and means including eccentrics on said shaft for swinging said jogger plates back and forth during each cycle.

8. In a sheet delivery slowdown, a sucker arranged to engage the tail end of a sheet and decelerate the sheet continously and progressively from sheet speed to zero speed to cause it to drop quietly onto a delivery pile, a sucker arm carrying said sucker at its upper end, and means for moving said sucker forward at a high level and rearward at a lower level comprising a pair of disks mounted one above the other for rotation about their axes, said sucker arm having a fluid connection intermediate its ends and a lengthwise guide, the lower disk having a crank connected with the lower end of said sucker arm and the upper disk having a crank slidable within said lengthwise guide, and means for rotating said disks in the same direction at the same speed.

9. A sheet delivery slowdown as defined in claim 8, comprising means for causing both cranks simultaneously to be disposed in the vertical plane angularly spaced 180° twice for each cycle, and for causing the sucker when moving forward at said high level to accelerate and decelerate rapidly and when moving rearward at said lower level to travel at a relatively slow rate of speed.

10. In a sheet delivery slowdown, two stationary brackets spaced apart transversely of the sheet path, a pair of upper and lower disks rotatably mounted one above the other in said brackets on the outer side of each bracket, means between said brackets for rotating all of said disks continuously in the same direction at the same rate of speed, a sucker arm disposed outwardly of each pair of disks, each sucker arm having a sucker mouth at its upper end and having a lengthwise guide groove, each lower disk having a crank connected with the lower end of the adjacent sucker arm and each upper disk having a crank slidable within the lengthwise guide groove of the adjacent sucker arm, said arms having fluid passages leading to their respective sucker mouths, flexible conductors leading to said passages, the cranks of the upper disks and the cranks of the lower disks being oppositely disposed and angularly spaced 180° when they stand in vertical planes, whereby the suckers move at a high level in one direction while accelerating and decelerating rapidly and move relatively slowly at a lower level in the opposite direction.

11. A sheet delivery slowdown as defined in claim 10, comprising a fixed transverse pipe, a second set of brackets mounted thereon spaced laterally from said first named brackets, the outer ends of said flexible conductors being operatively connected through said second brackets with the bore of said pipe, and means for inducing suction in said pipe once for each cycle.

12. A sheet delivery slowdown as defined in claim 10, wherein each of said brackets has a horizontal suction plate at its upper end and wherein said suckers in traveling forward move through an arc extending at one point slightly above the surfaces of said suction plates, comprising two fixed transverse pipes upon which said brackets are supported, said brackets having passages extending from the bore of the first of said pipes to the surfaces of said suction plates, the outer ends of said flexible conductors being operatively connected with the bore of the second pipe, means for maintaining suction continuously in said first pipe and means for inducing suction and pressure alternately in said second pipe during each cycle.

13. In a sheet delivery slowdown, a pair of horizontally spaced suction plates having flat upper surfaces containing suction openings, grippers adapted to grasp the forward end of each sheet and drag it forward over said suction plates, at least one sucker disposed beneath the sheet path and between said suction plates adapted while moving forward at sheet speed to grasp the tail end of the sheet just before it leaves said suction plates, means for causing the grippers to release the sheet, and means for decelerating the sucker continuously and progressively from sheet speed to zero speed and cutting off its suction to release the sheet and for causing the sucker to move rearwardly at a lower level when said zero speed is reached preparatory to again rising and moving forward to take the next succeeding sheet.

14. A delivery slowdown substantially as defined in claim 13, comprising means for causing a blast of air to be ejected through the sucker mouth at the forward end of the sucker movement after the suction is cut off to release the sheet and blow it upwardly from the sucker mouth.

15. In a pile delivery mechanism, conveying means passing over a pile of sheets, sheet grippers carried by said conveying means adapted to receive sheets from a sheet handling machine and transport them in a generally horizontal path above the top of said pile, sheet slowdown means adjacent the top of the pile along that edge thereof from which sheets conveyed to the pile approach *to tauten the sheet,* said slowdown means comprising a rubber sucker moving at *substantially* sheet speed *to engage and take* [substantially when it takes] the *tautened* sheet, means intermittently communicating suction thereto, and means moving said sucker in the direction of sheet travel in a path at least a portion of which generally coincides with the sheet path *to engage and take the sheet,* said sucker taking hold of the tail of a sheet while the paths generally coincide and while the forward end of the sheet is held by the sheet grippers, means operating the sheet grippers to release the sheet after the sucker has taken it, said sucker moving means being operated at a varying speed and decelerating to a speed near zero speed to decrease the speed of the sheet held thereby and being adapted upon release of suction to said sucker to reverse the direction of travel of said sucker.

16. Mechanism according to claim 15 wherein air pressure creating means is provided and wherein air under pressure is communicated to said sucker upon release of a sheet whereby the air pressure ejects the sheet and maintains it spaced from the sucker as the sucker begins its reverse travel.

17. In a pile delivery mechanism, conveying means passing over a pile of sheets, sheet grippers carried by said conveying means adapted to receive sheets from a sheet handling machine and transport them in a generally horizontal path above the top of said pile, sheet slowdown means adjacent the top of the pile along that edge thereof from which sheets approach the pile, said slowdown means comprising a pair of suckers engageable with the tail of each sheet, means intermittently communicating suction to said suckers, means including a rotating shaft on a fixed axis operatively connected to and causing oscillation of said suckers in the direction of sheet travel in a path at least a portion of which generally coincides with the sheet path, said sucker taking hold of the tail of a sheet while it is held by the sheet grippers, means operating the sheet grippers to release the sheet after it has been taken by the suckers, a jogger plate engageable with that edge of the pile adjacent the slowdown means and extending above and below the top of the pile, and means operatively connecting the jogger plate and the rotating shaft for moving said jogger plate into engagement with the pile after release of a sheet by said suckers whereby said sheet is brought into alignment with the remaining sheets on said pile.

18. A pile delivery mechanism according to claim 17 wherein the means for moving the jogger plate comprises as eccentric carried on said rotating shaft, and a connecting rod intermediate said eccentric and said jogger plate.

19. In a pile delivery mechanism, conveying means passing over a pile of sheets, sheet grippers carried by said conveying means adapted to receive sheets from a sheet handling machine and transport them in a generally horizontal path above the top of the pile, sheet slowdown means adjacent the top of the pile along that edge thereof from which sheets conveyed to the pile approach, said slowdown means having vacuum communicated thereto and being operated to grip sheets with vacuum on their undersides, decelerate them continuously and progressively from sheet speed to zero speed, and assist in depositing them gently upon the top of a pile, and valve means connecting the slowdown means first to a source of vacuum while slowing down a sheet and then connecting the slowdown means to a source of air under pressure to expel any foreign matter gaining entrance into the slowdown means or connections thereto, and to disconnect the sheet from the slowdown means as the latter begins its reverse travel.

20. Mechanism according to claim 19 including an air pipe spaced substantially vertically above the slowdown means and transverse to the sheet path, said air pipe being connected to said valve means and having ports along its length directed toward the slowdown means in order to impinge air under pressure toward said slowdown means to assist holding sheets held thereby against the slowdown means, said valve means comprising a rotor having two diametrically opposed circumferential slots on its periphery each extending at least 90° therearound and both lying in the same plane perpendicular to the axis of the rotor, a valve casing having a cylindrical opening for the rotor, a connection from the source of air pressure to the cylindrical opening, a connection from the source of vacuum to the opening but spaced therearound 180° from the air pressure connection, the connections to the slowdown means and to the air pipe being diametrically opposed and at right angles to the air pressure and vacuum connections, all of said connections being in the path of movement of said slots whereby when vacuum is communicated to said slowdown means air pressure is communicated to the air pipe, and when air pressure is communicated to the slowdown means vacuum is communicated to the air pipe.

21. The method of depositing sheets onto the top of a pile thereof, comprising the steps of gripping and moving sheets in a generally horizontal path spaced above the top of said pile, moving a rubber suction mouth in the direction of sheet travel in a path at least a portion of which generally coincides with the sheet path, *engaging and* taking hold of the tail of a sheet with the suction mouth while the paths generally coincide and while the speed of the mouth is *substantially* [at least as great as] sheet speed, releasing the initial grip on the sheet, decelerating the speed of travel of said mouth continuously and progressively to gradually decrease the speed of the sheet held thereby to zero speed, releasing the hold of said mouth to release the sheet and permit it to settle onto the pile, and returning the suction mouth to its original position while relatively separating the sheet and suction mouth paths during such return to prevent said [resilient] *rubber* suction mouth from dragging on the next sheet to be deposited.

22. The method according to claim 21 including the step of maintaining the sheets in their path by supporting them from below and applying a jet of air from above at least during the time the suction mouth takes the sheets.

23. The method of depositing sheets onto the top of a pile thereof comprising the steps of gripping and moving sheets in a generally horizontal path spaced above the top of said pile, moving a rubber suction mouth in the direction of sheet travel in the path of an arc having acceleration to the middle point of the arc and then deceleration, at least a portion of the sucker path generally coinciding with the sheet path, *engaging and* taking hold of the tail of a sheet with the suction mouth while the paths generally coincide, said suction mouth traveling at a speed slightly faster than sheet speed during such *engaging and* taking, releasing the initial grip of the sheet, decreasing the speed of said mouth to gradually and evenly decrease the speed of the sheet held thereby continuously and progressively to zero speed, releasing the hold of said mouth to release the sheet and permit it to settle onto the pile, and returning the suction mouth along a path removed from the sheet path to prevent engagement of said mouth and the next sheet to be deposited.

24. The method according to claim 23 including the additional step of providing a jet of air from said suction mouth as each sheet is released by the mouth to eject said settling sheet to prevent its dragging across the suction mouth as the latter begins its return stroke.

25. The method of depositing sheets onto the top of a pile thereof, comprising the steps of gripping and moving the sheets in a generally horizontal path above the top of said pile, moving a pair of rubber suckers in the direction of sheet travel in a substantially vertical arcuate path below the sheet path and tangential with the sheet path, connecting said suckers to a source of suction, taking hold of the tail of a sheet with the suckers when the sheet and sucker paths coincide at said tangential point, releasing the initial grip on said sheet, reducing the speed of travel of said suckers gradually and evenly to decrease the sheet speed continuously and progressively, disconnecting the suckers from the suction source and connecting them with a source of air under pressure when the speed of the sheet has been reduced to a speed near zero to cause said suckers to eject the sheet and simultaneously clear the suckers of any foreign matter, and returning the suckers along a path removed from the sheet path to prevent engagement of said suckers and the next sheet during such return stroke, and the first part of the forward travel of the suckers before they grasp the next sheet.

26. The method according to claim 25 including maintaining the sheets in their path by supporting them from below and applying an air jet from above at least during the time the suckers take the sheet, and producing suction in the sheet supports to create a drag on the underside of each sheet and thereby maintain the sheets relatively taut for facilitating taking by the suckers.

References Cited in the file of this patent or the original patent

UNITED STATES PATENTS

| | | |
|---|---|---|
| 1,646,529 | Fallot | Oct. 25, 1927 |
| 2,106,199 | Wormser | Jan. 25, 1938 |
| 2,130,841 | Eckhard | Sept. 20, 1938 |
| 2,167,470 | West | July 25, 1939 |
| 2,282,224 | Harrold | May 5, 1942 |
| 2,657,052 | Elliott | Oct. 27, 1953 |